(12) United States Patent
Trattler (10) Patent No.: US 9,386,661 B2
(45) Date of Patent: Jul. 5, 2016

(54) DRIVER CIRCUIT AND METHOD FOR DRIVING AN ELECTRICAL LOAD

(75) Inventor: Peter Trattler, Graz (AT)

(73) Assignee: AMS AG, Unterpremstaetten (AU)

( * ) Notice: Subject to any disclaimer, the term of this patent is extended or adjusted under 35 U.S.C. 154(b) by 131 days.

(21) Appl. No.: 14/240,324

(22) PCT Filed: Aug. 21, 2012

(86) PCT No.: PCT/EP2012/066275
§ 371 (c)(1),
(2), (4) Date: Jun. 11, 2014

(87) PCT Pub. No.: WO2013/030047
PCT Pub. Date: Mar. 7, 2013

(65) Prior Publication Data
US 2014/0292220 A1   Oct. 2, 2014

(30) Foreign Application Priority Data

Sep. 1, 2011 (DE) .......................... 10 2011 112 188

(51) Int. Cl.
*H05B 37/02* (2006.01)
*H05B 33/08* (2006.01)
*H02M 3/157* (2006.01)

(52) U.S. Cl.
CPC .............. *H05B 37/02* (2013.01); *H02M 3/157* (2013.01); *H05B 33/0815* (2013.01); *H05B 33/0827* (2013.01); *Y02B 20/347* (2013.01)

(58) Field of Classification Search
CPC ....................................................... H05B 37/02
See application file for complete search history.

(56) References Cited

U.S. PATENT DOCUMENTS

| 8,093,830 | B2 * | 1/2012 | Inoue ................. | H05B 33/0815 315/291 |
| 8,390,214 | B2 * | 3/2013 | Van Laanen ........ | H02M 1/4225 315/294 |
| 8,847,500 | B2 * | 9/2014 | Lin .................... | H05B 33/0815 315/193 |
| 2007/0080911 | A1 | 4/2007 | Liu et al. | |
| 2011/0062872 | A1 | 3/2011 | Jin et al. | |
| 2011/0068700 | A1 | 3/2011 | Fan | |
| 2011/0204798 | A1 * | 8/2011 | Cusinato ............ | H05B 33/0815 315/161 |

FOREIGN PATENT DOCUMENTS

| DE | 10040154 A1 | 3/2002 |
| DE | 102004034359 B3 | 2/2006 |
| DE | 102008030365 A1 | 8/2009 |

* cited by examiner

*Primary Examiner* — Douglas W Owens
*Assistant Examiner* — Pedro C Fernandez
(74) *Attorney, Agent, or Firm* — McDermott Will & Emery LLP (57) ABSTRACT

A driver circuit (11) for a current regulator (13), which can be coupled in series to an electrical load (14), comprises a control circuit (12) for controlling the current regulator (13). The control circuit (12) is designed to determine at least two target current values (SW1) for the current regulator current (IS1) of the current regulator (13) for at least two points in time in an operation phase on the basis of a signal (VS1, STR) that can be tapped at the current regulator (13).

16 Claims, 5 Drawing Sheets

DRIVER CIRCUIT AND METHOD FOR DRIVING AN ELECTRICAL LOAD

The present patent application pertains to a driver circuit, a lighting arrangement and a method for driving an electrical load.

An electrical load having, for example, a light-emitting diode, abbreviated LED, is frequently operated with a driver circuit that comprises a control circuit and a current regulator. The current regulator is arranged in series with the electrical load and is adjusted by the control circuit.

Document US 2011/0062872 A1 describes a driver circuit for a plurality of electrical loads, each having at least one LED, that are arranged in parallel. Values for the current of the current regulators are ascertained in a calibration method. The values of the current are held constant during operation of the electrical loads.

Document DE 10040154 A1 is concerned with an illuminated advertising sign in which a voltage supplies a plurality of light-emitting diodes via a constant current source. A comparator compares the voltage across the constant current source with a target value.

A task of the present patent application is to provide a driver circuit, a lighting arrangement and a method for driving an electrical load that have a high efficiency.

This task is solved with the subject matter of Claims 1 and 15 and with the method of Claim 16. Refinements and configurations are the subject matter of the dependent claims.

In one embodiment, a driver circuit for a current regulator, which can in particular be coupled in series to an electrical load, contains a control circuit for driving the current regulator. The control circuit is designed to determine at least two target current values for the current regulator current of the current regulator for at least two points in time in an operation phase on the basis of a signal that can be tapped at the current regulator.

In one embodiment, the at least two target current values are ascertained in such a manner that a supply voltage associated with the current regulator is reduced.

The target current values of the current regulator are advantageously determined at least at two points in time during the operation of the current regulator. Thus the current regulator is controlled during operation. Different target current values for the current regulator can be ascertained at the at least two points in time. The target current value for the current regulator is varied in such a manner that it leads to a decreasing supply voltage.

In one embodiment, the supply voltage drops across the electrical load and the current regulator. The supply voltage can be provided via a series circuit comprising the electrical load and the current regulator.

In one embodiment, the supply voltage has equal magnitude at the at least two points in time. The control circuit is designed to perform a gradual optimization in the form of a reduction of the supply voltage in an extended operation. Therefore the supply voltage preferably does not change abruptly. The control circuit has the effect that the supply voltage is lower at the later of the at least two points in time than at the earlier of the at least two points in time. The at least two points in time can be in a time section of an operating phase that follows a start phase. In this time section, a voltage converter generating the supply voltage operates in a nearly stabilized state. During the start phase, the supply voltage starts at 0 V.

The supply voltage is approximately constant during the time section of the operating phase in which the at least two points in time are located. Even with a nearly constant supply voltage, the characteristics of the electrical load can change due to a temperature drift or an aging effect in the electrical load in such a manner that the supply voltage can be reduced by means of a modification of the target current value. The at least two points in time can also be in a time section of the operating phase during which the supply voltage rises or falls. A rise can be caused, for example, by external influences such as a change in temperature.

In one embodiment, the control circuit is designed to determine the target value for the current regulator continuously in the operating phase. The determination takes place for at least two points in time and in the period of time between the at least two points in time.

In a preferred embodiment, the control circuit is designed to operate the current regulator using pulse width modulation. The operating phase comprises at least two clock cycles. A first of the at least two points in time is situated in a first clock cycle, and a second of the least two points in time is situated in a second clock cycle of the operating phase. The at least two points in time are not in the same clock cycle. The target current value for the current regulator is ascertained both in the first and in the second clock cycle. A clock cycle has a switched-on phase and a switched-off phase. The clock cycle has a period duration. The period duration can be a predetermined constant duration. The signal that can be tapped at the current regulator is preferably tapped in the switched-on phase of the current regulator. Typically no current regulator current is flowing in the switched-off phase. The control circuit preferably adjusts the target current value ascertained in one clock cycle in the subsequent clock cycle at the current regulator. For example, the target current value is ascertained in at least ten clock cycles and adjusted. The target current value for the current regulator is advantageously ascertained and adjusted quasi-continuously. A particularly high efficiency of the overall system can be achieved in this manner.

In one embodiment, the control circuit is designed to adjust a duty ratio with which the current regulator is operated to be constant. The duty ratio can have the value of 100% for example.

In an alternative embodiment, the control circuit is designed to ascertain the duty ratio with which the current regulator is operated on the basis of the signal that can be tapped at the current regulator. For example, the target current value can be reduced and the duty ratio can be correspondingly increased in order to hold constant an electric power used by the electrical load.

In one embodiment, the signal that can be tapped at the current regulator is a current regulator voltage that can be tapped at a load terminal between the current regulator and the electrical load. The current regulator voltage can drop across the current regulator for example. The current regulator is connected to the electrical load via the load terminal. The current regulator voltage can be tapped between a supply potential terminal of the current regulator and the load terminal.

Alternatively, the signal that can be tapped at the current regulator can be a control signal of the transistor in the current regulator. The current flowing through the current regulator flows through the transistor. The transistor is provided for controlling the current flowing through the current regulator.

In one embodiment, the control circuit is designed to determine an adjusting coefficient on the basis of the signal that can be tapped at the current regulator. The control circuit is additionally designed to determine the target current value by multiplication or division of a predetermined target current value and the adjusting coefficient. Thus the difference between the target current value and the predetermined target current value is known at every point in time. This information regarding the relative difference can be useful, for example, for determining a duty ratio of a pulse width modulation with which the current regulator is operated.

In a refinement, the control circuit is designed to determine the duty ratio with which the current regulator is operated by division or multiplication of a predetermined duty ratio and the adjusting coefficient. If the target current value results from the multiplication of the adjusting coefficient and the predetermined target current value, then the duty ratio follows from the division of the predetermined duty ratio by the predetermined adjusting coefficient. Alternatively, if the target current value is ascertained by dividing the predetermined target value by the adjusting coefficient, then the duty ratio results from the multiplication of the adjusting coefficient and the predetermined duty ratio. This has the effect that the product of the target current value and the duty ratio is equal to the product of the predetermined target current value and the predetermined duty ratio. Thereby an average load current remains constant and the brightness of the LED in the electrical load is approximately constant.

In one embodiment, the current source comprises a window comparator. The signal that can be tapped at the current regulator is supplied to the window comparator on the input side. The window comparator has two outputs. It is possible to determine with the window comparator whether the signal that can be tapped at the current regulator is below a predetermined signal range, in the predetermined signal range or above the predetermined signal range.

In one embodiment, the control circuit comprises an up/down counter. The up/down counter provides the adjusting coefficient on the output side. The up/down counter is coupled on the input side to the window comparator. The adjusting coefficient remains constant if the signal that can be tapped at the current regulator is within the predetermined signal range. The adjusting coefficient is increased if the signal that can be tapped at the current regulator is above the predetermined signal range and is decreased if the signal that can be tapped at the current regulator is below the predetermined signal range.

Alternatively, the adjusting coefficient is decreased if the signal that can be tapped at the current regulator is above the predetermined signal range and is increased if the signal that can be tapped at the current regulator is below the predetermined signal range.

In one embodiment, the control circuit comprises a first functional unit, which is coupled to the up/down counter at a first input. The adjusting coefficient is supplied to the first input of the first functional unit. The predetermined target current value, i.e. a signal representing the predetermined target current value, is supplied to a second input of the first functional unit. The target current value, i.e. a signal representing the target current value for the current regulator, can be tapped on the output side of the first functional unit. The first functional unit can be realized as a multiplier or a divider.

In a refinement, the control circuit comprises a second functional unit, which is coupled at a first input to the up/down counter. The adjusting coefficient is supplied to the first input of the second functional unit. The predetermined duty ratio, i.e. a signal representing the predetermined duty ratio, is supplied to a second input of the second functional unit. The duty ratio, i.e. a signal representing the duty ratio of the current regulator, can be tapped on the output side of the second functional unit. The current regulator is operated according to the duty ratio that can be tapped on the output side at the second functional unit. The second functional unit is provided to perform those mathematical operations that represent the inverse operation of the operation performed by the first functional unit. If the first functional unit is realized as a multiplier, then the second function unit is constructed as a divider. On the other hand, if the first functional unit is implemented as a divider, the second functioning unit is constructed as a multiplier.

In a refinement, the control circuit comprises a signal generator that is coupled on the input side to the second functional unit, and a clock signal having the duty ratio can be tapped on the output side. The signal generator is constructed as a pulse width modulator.

In one embodiment, the driver circuit comprises a lowpass filter that is coupled on its output side to the second input of the second functional unit. The lowpass filter converts a digital signal representing the predetermined duty ratio into a digital value.

In one embodiment, the control circuit is designed to control at least one further current regulator. The further current regulator can be coupled in series to the at least one further electrical load. The control circuit is designed to determine the target current value of the at least one further current regulator on the basis of a signal that can be tapped at the at least one further current regulator. The determination of at least two target current values can be performed for at least two points in time in the operating phase. The determination is preferably carried out at the at least two time points in the operating phase. The control unit can thus advantageously control a plurality of current regulators and thereby increase the efficiency of the arrangement as a whole.

In one embodiment, the control circuit is designed to adjust the duty ratios and the target current values for the current regulator and the at least one further current regulator in such a manner that a load voltage across the load and at least one further load voltage across the at least one further load have approximately the same value. If the load voltages are in agreement, the current regulator voltages dropping across the current regulator and the at least one further current regulator are likewise identical. The supply voltage is the sum of the load voltage and the current regulator voltage and is likewise the sum of the at least one further load voltage and the at least one further current regulator voltage. The control circuit is used for dynamically balancing the various electrical loads.

In one embodiment, the control voltage is designed to adjust the duty ratios and the target current values for the current regulator and the at least one further current regulator in such a manner that the product of the duty ratio and the target current value corresponds to a predetermined value for the respective current regulator. The predetermined value for the product of the current regulator can be equal to the predetermined value for the product of the at least one further current regulator. Alternatively, the predetermined values for the current regulator and for the at least one further current regulator can be different. This can have the result that the power consumed in the various electrical loads is different and for example the brightness of light-emitting diodes in the different electrical loads is different.

In one embodiment, the control voltage is designed to adjust the duty ratios and the target current values for the current regulator and the at least one further current regulator in such a manner that at least one of the target current values differs from a predetermined target current value.

In one embodiment, the control voltage is designed to adjust the duty ratios and the target current values for the current regulator and the at least one further current regulator in such a manner that at least one of the duty ratios differs from a predetermined target duty ratio.

In another embodiment, the control voltage is designed in such a manner that at least one of the duty ratios is 100%.

In one embodiment, the driver circuit comprises the current regulator. The current regulator can be realized as a current source or a current sink. The current regulator is connected at a control input to a control output of the control circuit. The driver circuit can have the at least one further current regulator. A control input of the at least one further current regulator is connected to at least one further control output of the control circuit.

In one embodiment, the driver circuit comprises the voltage converter.

In one embodiment, a lighting arrangement comprises the voltage converter. The driver circuit is coupled on the output side to a feedback input of the voltage converter.

The voltage converter can be realized as a DC/DC voltage converter. The voltage converter can be implemented as a buck converter, a boost converter or a boost/buck converter. The supply voltage can be tapped at a voltage converter output of the voltage converter. A series circuit comprising the current regulator and the electrical load couples the voltage converter output to a reference potential terminal. At least one further series circuit comprising the at least one further electrical load and the at least one further current regulator likewise couples the voltage converter output to the reference potential terminal.

In one embodiment, a semiconductor body comprises the driver circuit. The driver circuit is integrated on a first main surface of the semiconductor body. The driver circuit is implemented on a semiconductor body, for example, on precisely one semiconductor body.

In one embodiment, a lighting arrangement comprises the driver circuit and the electrical load. The electrical load comprises at least one light-emitting diode.

In one embodiment, the lighting arrangement is integrated as back-lighting in a device for mobile telecommunications or a tablet computer. The lighting arrangement can be used for large display screens.

In one embodiment, a method for driving an electrical load comprises tapping a signal at a current regulator that is arranged in series with the electrical load. At least two target current values of the current regulator current for the current regulator are ascertained for at least two points in time in an operating phase, on the basis of the signal that can be tapped at the current regulator, in such a manner that a supply voltage dropping across the electrical load and the current regulator is reduced. The target current values are adjusted at the current regulator.

The target current value is advantageously variable and can be adjusted depending on the signal. Thus the load voltage dropping at the electrical load and/or the current regulator voltage dropping across the current regulator can be reduced and the efficiency increased.

In one embodiment, at least two values of a setting coefficient can be determined on the basis of at least two values of the signal that can be tapped at the current regulator, and the at least two target current values can be ascertained by multiplying or dividing of a predetermined target current value and the at least two values of the setting coefficient.

The invention will be described in detail below for several exemplary embodiments with reference to the figures. Components or functional units that are functionally identical or have the identical effect bear identical reference numbers. Insofar as components or functional units correspond to one another in function, a description of them will not be repeated for each of the following figures. In the drawing.

Figure 1A:
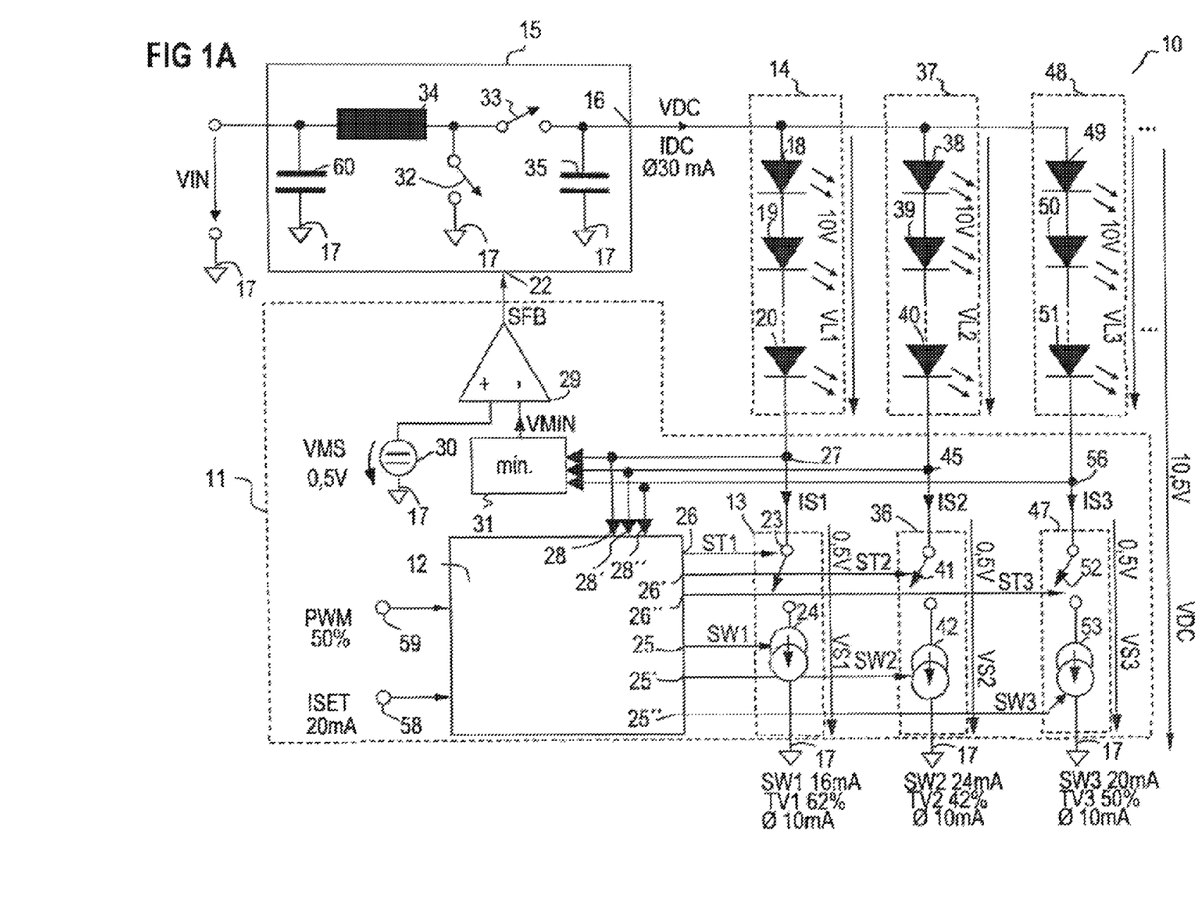
FIGS. 1A-1D show exemplary embodiments of a lighting arrangement with a driver circuit according to the proposed principle.

FIG. 1A shows an exemplary embodiment of a lighting arrangement 10 according to the proposed principle. The lighting arrangement 10 comprises a driver circuit 11. The driver circuit 11 comprises a control circuit 12 and a current regulator 13 that is connected on the input side to the control circuit 12. The lighting arrangement 10 further comprises an electrical load 14, which is arranged in series with the current regulator 13. In addition, the lighting arrangement 10 comprises a voltage converter 15. A series circuit comprising the current regulator 13 and the electrical load 14 is arranged between a voltage converter output 16 and a reference potential terminal 17. The current regulator 13 is connected to the reference potential terminal 17 and the electrical load 14 is connected to the voltage converter output 16. The lighting arrangement 14 comprises a first, second and third light-emitting diode 18, 19, 20, which are arranged in series with one another. A feedback output of the driver circuit 11 is coupled to a feedback input 22 of the voltage converter 15.

The current regulator 13 comprises a switch 23 and a current source 24 that are in series with one another. A first control output 25 of the control circuit 12 is connected to a control terminal of the current source 24. Correspondingly, a second control output 26 of the control circuit 12 is connected to a control terminal of the switch 23. A load terminal 27 is arranged between the electrical load 14 and the current regulator 13. The load terminal 27 is connected to a control input 28 of the control circuit 12. The driver circuit 11 further comprises a comparison circuit 29. A reference voltage source 30 is connected to a first input of the comparison circuit 29. A second input of the comparison circuit 29 is connected to the load terminal 27. The driver circuit 11 further comprises a selection block 31, which is coupled on the input side to the load terminal 27. On the output side, the selection block 31 is coupled to the second input of the comparison circuit 29. One output of the comparison circuit 29 is connected to the feedback output.

The voltage converter 15 is realized as a boost converter. The voltage converter 15 has a first and a second voltage converter switch 32, 33, as well as an inductor 34. An input of the voltage converter 15 is connected via the inductor 34 and the first voltage converter switch 32 to the reference potential terminal 17. A node between the inductor 34 and the first voltage converter switch 32 is coupled via the second voltage converter switch 33 to the voltage converter output 16. An output capacitor 35 connects the voltage converter output 16 to the reference potential terminal 17. An input capacitor 60 couples the input of the voltage converter 15 to the reference potential terminal 17.

The driver circuit 11 further comprises an additional current regulator 36, which is coupled on the input side to the control circuit 12. The lighting arrangement 10 further comprises a further electrical load 37, which is arranged in series with the further current regulator 36. A series circuit, comprising the further electrical load 37 and the further current regulator 36, couples the voltage converter output 16 to the reference potential terminal 17. The further electrical load 37 is connected to the voltage converter output 16 and the further current regulator 36 is connected to the reference potential terminal 17. The further electrical load 37 comprises further light-emitting diodes 38, 39, 40. The further current regulator 36 comprises a further switch 41 and a further current source 42 that are in series with one another. A further first control output 25' of the control circuit 12 is connected to a control terminal of the further current source 42. Correspondingly, a further second control output 26' of the control circuit 12 is connected to a control input of the further switch 41. A further load terminal 45 is arranged between the further electrical load 37 and the further current regulator 36. The further load terminal 45 is connected to one input of the selection block 31. The selection block 31 is constructed as a minimum detector. The further load terminal 45 is connected to a further control input 28' of the control circuit 12.

The driver circuit 11 further comprises an additional current regulator 47, which is coupled on the input side to the control circuit 12. The lighting arrangement 10 further comprises an additional electrical load 48, which is arranged in series with the additional current regulator 47. A series circuit, comprising the additional electrical load 48 and the additional current regulator 47, couples the voltage converter output 16 to the reference potential terminal 17. The additional electrical load 48 comprises additional light-emitting diodes 49, 50, 51. The additional current regulator 47 comprises an additional switch 52 and an additional current source 53 that are in series with one another. An additional first control output 25" of the control circuit 12 is connected to a control input of the additional current source 53. An additional second control output 26" is correspondingly connected to a control terminal of the additional switch 52.

An additional load terminal 56 is arranged between the additional electrical load 48 and the additional current regulator 47. The additional load terminal 56 is connected to an additional control input of the selection block 31. The additional load terminal 56 is further connected to an additional control input 28" of the control circuit 12.

An input voltage VIN is supplied to the input of the voltage converter 15. The input voltage VIN drops across the input capacitor 60. The voltage converter 15 converts the input voltage VIN into a supply voltage VDC, which can be tapped at the voltage converter output 16. The supply voltage VDC drops between the voltage converter output 16 and the reference potential terminal 17. The supply voltage VDC thus drops across the series circuit comprising the current regulator 13 and the electrical load 14. The supply voltage VDC likewise drops across a further series circuit comprising the further current regulator 36 and the further electrical load 37. The supply voltage VDC further drops across the additional electrical load 48 and the additional current regulator 47. At its voltage converter output 16, the voltage converter 15 provides a voltage converter current IDC, which is divided into partial currents that flow through the electrical loads 14, 37, 48.

A current regulator current IS1 flows through the electrical load 14 and the current regulator 13. The current regulator 13 adjusts the current regulator current IS1. Correspondingly, the further current regulator 36 adjusts a further current regulator current IS2. The further current regulator current IS2 flows through the further electrical load 37 and the further current regulator 36. The additional current regulator 47 additionally adjusts an additional current regulator current IS3. The additional current regulator current IS3 flows through the additional electrical load 48 and the additional current regulator 47. It therefore holds for the value of a voltage converter current IDC provided by the voltage converter 15 that:

$$IDC = \Sigma_{i=1}^{N} ISi = IS1 + IS2 + IS3$$

A current regulator voltage VS1 drops across the current regulator 13. Correspondingly, a further current regulator voltage VS2 drops across the further current regulator 36, and an additional current regulator voltage VS3 drops across the additional current regulator 47. A load voltage VL1 drops across the electrical load 14. Correspondingly, a further load voltage VL2 drops across the further electrical load 37 and an additional load voltage VL3 drops across the additional electrical load 48. The following equation applies to the value of the supply voltage VDC:

$$VDC = VL1 + VS1 = VL2 + VS2 = VL3 + VS3$$

The current regulator voltage VS1, the further current regulator voltage VS2 and the additional current regular voltage VS3 are supplied to the inputs of the selection block 31. The selection block 31 selects the voltage at its input that has the smallest value. On the output side, the selection block 31 provides the smallest voltage that is supplied to it at one of its inputs. The selected signal VMIN, which can be tapped at the output of the selection block 31, is supplied to the second input of the comparison circuit 29. The reference voltage source 30 provides a target voltage value VMS, which is fed to the first input of the comparison circuit 29. The target voltage value VMS corresponds to the minimum voltage value that one of the current regulators 13, 36, 47 requires for its operation. A feedback signal SFB, which is supplied via the feedback output of the driver circuit 11 to the feedback input 22 of the voltage converter 15, is provided at the output of the comparison circuit 29. A control circuit, not shown, of the voltage converter 15 controls the voltage converter 15 according to the feedback signal SFB. The comparison circuit 29 is realized as a comparator. Alternatively, the comparison 29 circuit can be constructed as an operational amplifier, a transconductance amplifier or a differential amplifier. A transconductance amplifier is mainly used. If the selected signal VMIN is lower than the target voltage value VMS, the voltage converter 15 will be adjusted in such a manner that the supply voltage VDC is increased. If the target voltage value VMS is lower than the selected signal VMIN, however, then the voltage converter 15 will be controlled such that the supply voltage VDC is reduced.

The current regulator voltage VS1 is supplied to the control input 28. Correspondingly, the further current regulator voltage VS2 and the additional current regulator voltage VS3 are supplied to the further and the additional control inputs 28', 28". The control unit 12 has a processor. The processor can be realized as a microprocessor or microcontroller, or as an analog/digital circuit. A first adjusting signal ISET, which represents a predetermined target current value, is supplied to a first setting input 58 of the control circuit 12. Correspondingly, a second adjusting signal PWM, which represents a predetermined duty ratio, is supplied to a second setting input 59 of the control circuit 12.

At the first control output 25, the control circuit 12 provides a target current value SW1, which is supplied to the control input of the current source 24. Via the second control output 26, the control circuit 12 correspondingly provides a clock signal ST1, which is supplied to the control input of the switch 23. At the further first control output 25', the control circuit 12 provides a further target current value SW2, which is supplied to the control input of the further current source 42. Via the further second control output 26', the control circuit 12 provides a further clock signal ST2, which is supplied to the control input of the further switch 41. The control circuit 12 similarly generates an additional target current value SW3, which is to be supplied to the control input of the additional current source 53 via the additional second control output 25", and an additional clock signal ST3, which is to be supplied to the control input of the additional switch 52 via the additional second control output 26".

The control circuit 12 determines the target current value SW1 on the basis of the current regulator voltage VS1 and the predetermined target current value ISET. The target current value SW1 can also depend on the predetermined duty ratio PWM. The target current value SW1 can additionally depend on the current regulator voltages VS2, VS3 of the further current regulators 36, 47, i.e. on the further current regulator voltage VS2 and the additional current regulator voltage VS3. Corresponding conditions apply to the further and the additional target current values SW2, SW3. The control circuit 12 adjusts the target current value SW1, the further target current value SW2 and the additional target current value SW3 in such a manner that the current regulator voltages, i.e. the current regulator voltage VS1, the further current regulator voltage VS2 and the additional current regulator voltage VS3, agree. Furthermore, the control circuit 12 adjusts a duty ratio TV1 of the clock signal ST1, a further duty ratio TV2 of the further clock signal ST2 and an additional duty ratio TV3 of the additional clock signal ST3 in such a manner that the product of the target current value and the duty ratio of the respective current regulator is equal to the product of the predetermined target current value ISET and the predetermined duty ratio PWM. Therefore:

$$ISET \cdot PWM = SW1 \cdot TV1 = SW2 \cdot TV2 = SW3 \cdot TV3$$

The control circuit 12 is designed for dynamically adjusting the target current value SW1 and the duty ratio TV1. The target current value SW1, the further target current value SW2 and the additional target current value, as well as the duty ratio TV1, the further duty ratio TV2 and the additional duty ratio TV3 are adjusted in such a manner that the load voltage, the further load voltage VL2 and the additional load voltage VL3 assume the same value.

The different loads 14, 37, 47 can be unbalanced and require different forward voltages in order to have the same load current value. If the target current values SW1, SW2, SW3 were set to the same value, then the load voltage VL1, VL2, VL3 would be highest at one of the electrical loads 14, 37, 48. According to the numerical values provided as examples in FIG. 1A, the load voltage VL1 would be higher than the additional load voltage VL3 and the latter would in turn be higher than the further load voltage VL2. In order to achieve as low a value for the supply voltage VDC as possible, the duty ratio TV1 of the current regulator 13 is raised and the target current value SW1 of the current regulator 13 is reduced. By reducing the target current value SW1, the load voltage VL1 dropping across the electrical load 14 decreases. In that way, the value of the output voltage VDC can likewise be reduced. On the contrary, a lower value for the further load voltage VL2 is suitable for the further electrical load 37 in order to achieve said load current value. In order to operate the further electrical load 37 with the same load voltage VL2 as the electrical load 14, the further duty ratio is TV2 reduced and the further target current value SW2 is increased.

Feeding back the current regulator voltages VS1, VS2, VS3 via the selection block 31 and the comparison circuit 29 has the effect that the current regulator voltages VS1, VS2, VS3 assume the target voltage value. The driver circuit 11 is designed to adjust all current regulator voltages VS1, VS2, VS3 to the minimum value, namely the target voltage value VMS. Thus the excess voltage for a small electrical load is reduced in the respective current regulator. The average load current AVC is equal. The average current AVC can be calculated according to the following equation:

$$AVC = SW1 \cdot TV1 = SW2 \cdot TV2 = SW3 \cdot TV3$$

According to the example shown in FIG. 1A, the target voltage value VMS is 0.5 V, the predetermined duty ratio PWM is 50% and the predetermined target current value ISET is 20 mA. This results in an average current value AVC of 10 mA for all three loads 14, 37, 47. The current value SW1 is below the predetermined target current value ISET, while the further target current value SW2 is above the predetermined target current value ISET. Conversely the duty ratio TV1 is above the predetermined duty ratio PWM and the further duty ratio TV2 is below the predetermined duty ratio PWM. Because the electrical load 14 has the highest forward voltage in the example of FIG. 1A, the target current value SW1 is automatically and autonomously reduced by the control circuit 12, so that the supply voltage VDC can be lowered. The same brightness can be output by means of the light-emitting diodes 18, 19, 20 with lower power consumption.

In an alternative embodiment, not shown, the lighting arrangement 10 comprises more than three electrical loads and more than three current regulators. Alternatively, the lighting arrangement can have only two electrical loads 14, 37 and two current regulators 13, 36. The additional electrical load 48 and the additional current regulator 47 can be omitted in this embodiment.

In an alternative embodiment, not shown, the current regulators 13, 36, 47 are connected to the voltage converter output 16, and electrical loads 14, 37, 48 are connected to the reference potential terminal 17.

In an alternative embodiment, not shown, the voltage inverter 15 is realized as a buck converter or a boost/buck converter. Alternatively, the voltage converter 15 can be realized as a charge pump.

In a further embodiment, not shown, more or fewer than the three LEDs per load shown as an example are used.

Figure 1B:
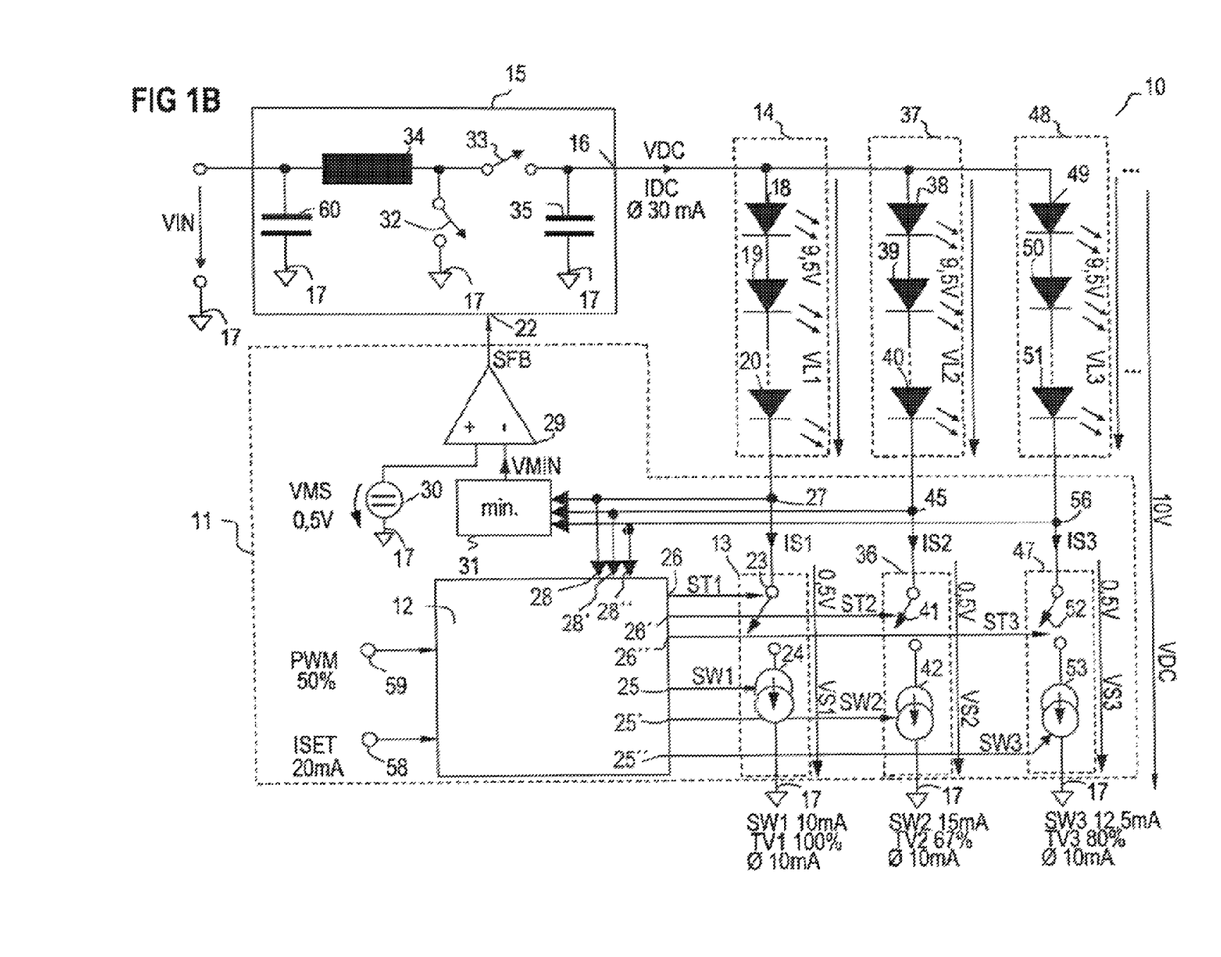

FIG. 1B shows a further exemplary embodiment of the lighting arrangement according to the proposed principle, which is a refinement of the embodiment shown in FIG. 1A. The control circuit 12 in FIG. 1B has alternative method steps as compared to the control circuit 12 from FIG. 1A. The control circuit 12 is designed to set at least the duty ratio to 100%. If the target current values SW1, SW2, SW3 of all current regulators 13, 36, 47 were set to the same value, then one of the load voltages VL1, VL2, VL3 would be the highest one. The duty ratio for the current regulator belonging to this electrical load is set to 100%. In the example according to FIG. 1B, this applies to the electrical load 14 and the current regulator 13. The target current value SW1 for the current regulator 13, which is adjusted to a duty ratio TV1 of 100% by the control circuit 12, is calculated according to the following equation:

$$SW1 = ISET \cdot PWM$$

Due to the characteristics of the electrical load, in this case the electrical load 14, a value of 9.5 V for the load voltage VL1 results for the target current value SW1 ascertained in this manner, for example. The current regulator voltages VS1, VS2, VS3 in all three current regulators 13, 36, 47 have the target voltage value VMS of 0.5 V, for example. Because the three current regulator voltages VS1, VS2, VS3 have the identical value, the load voltages VL1, VL2, VL3 likewise have the same value, 9.5 V in this case. This results in a value of 10 V for the supply voltage VDC. Due to the characteristics of the further electrical load 37, the further target current value SW2 results for the further load voltage VL2, 15 mA in this case. Due to the load voltage VL2 dropping across the additional electric load 47, 9.5 V in this case, and the current/voltage characteristic of the additional electrical load 47, the control circuit 12 adjusts the additional target current value SW3. In this example the additional target current value SW3 is 12.5 mA. The further duty ratio TV2 and the additional duty ratio TV3 are calculated by the control circuit 12 according to the following equations:

$$TV2 = \frac{ISET \cdot PWM}{SW2} = \frac{SW1}{SW2}$$
$$TV3 = \frac{ISET \cdot PWM}{SW3} = \frac{SW1}{SW3}$$

According to FIG. 1B, the duty ratio for one of the electrical loads 14, 37, 48 is raised to 100%, so that one of the electrical loads 14, 37, 48 is constantly switched on. Because the peak current through the electrical load 14 is now reduced, while the average current value AVC remains identical due to the increase in the corresponding duty ratio TV1, the load voltage VL1 in this branch is further reduced. For example, a current supplied to the voltage converter 15 in an arrangement 10 according to FIG. 1B can be 5% lower than the current that is supplied to the voltage converter 15 in the arrangement in FIG. 1A.

In an alternative embodiment, not shown, the control circuit 12 adjusts more than one duty ratio to 100%. The control circuit 12 can also adjust all duty ratios TV1, TV2, TV3 to 100%. In this case, the target current values SW1, SW2, SW3 are identical and can be calculated according to the following equation:

$$SW1 = SW2 = SW3 = ISET \cdot PWM$$

This leads to different values for the current regulator voltages VS1, VS2, VS3. The value of the supply voltage VDC increases slightly. Such a control circuit 12 can advantageously be realized with very low expense. The efficiency is improved due to the fact that the duty ratios TV1, TV2, TV3 are higher than the predetermined duty ratio PWM.

In an alternative embodiment, not shown, the lighting arrangement 10 comprises only an electrical load 14 and a current regulator 13. The further and additional electrical load 37, 48 and the further and additional current regulator 36, 47 can be omitted in this embodiment. The duty ratio TV1 and the target current value SW1 are adjusted as follows in this case:

$$TV1 = 100\% \text{ and } SW1 = ISET \cdot PWM$$

Figure 1C:
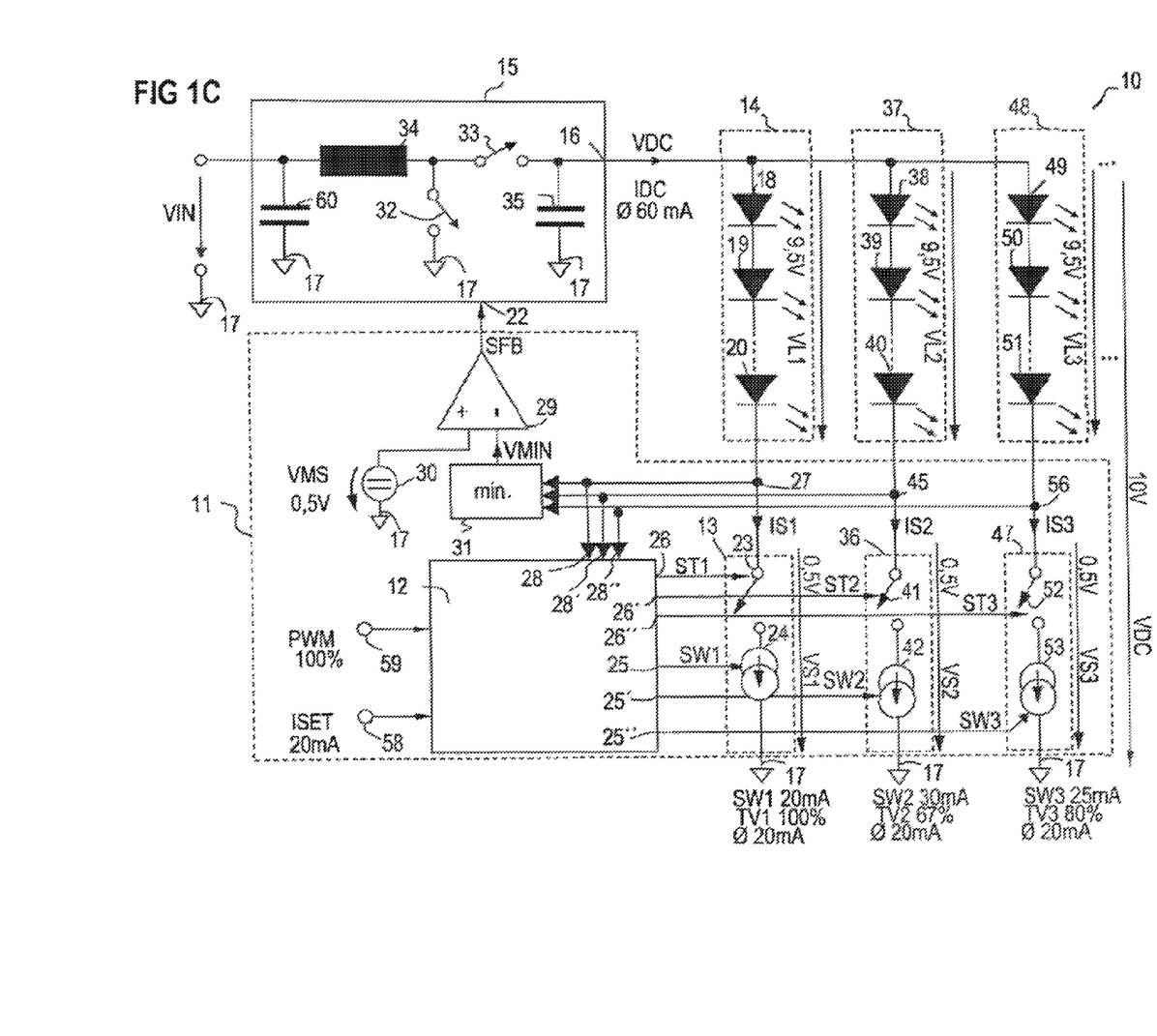

FIG. 1C shows a further exemplary embodiment of a lighting arrangement according to the proposed principle, which is a refinement of the embodiments shown in FIGS. 1A and 1B. The control circuit 12 in this case is designed to perform a method that is a refinement of the methods explained in FIGS. 1A and 1B. The control circuit 12 is designed to adjust the target current values SW1, SW2, SW3 to the predetermined target current value ISET in a first operating phase. The current regulator voltages VS1, VS2, VS3 are supplied to the control circuit 12. The lowest value of the current regulator voltages VS1, VS2, VS3 appears at one of the three current regulators 13, 36, 47. This is current regulator 13 in the example shown in FIG. 1C. For the current regulator 13, the control circuit 12 adjusts the target current value SW1 to the predetermined target current value ISET in a second operating phase, and sets the duty ratio TV1 to the predetermined duty ratio PWM. The predetermined duty ratio PWM is 100%.

The control circuit 12 is designed to reduce the target current value SW2 for the further regulator 36 in the second operating phase in such a manner that the further current regulator voltage VS2 of the further current regulator 36 corresponds to the current regulator voltage VS1 of the current regulator 13. By controlling the voltage converter 15, the current regulator voltage VS1 in the second operating phase is set to the target voltage value VMS. Therefore the further current regulator voltage VS2 also assumes the target voltage value VMS. Correspondingly, the control circuit 12 determines the additional target current value SW3, at which the additional current regulator voltage VS3 is equal to the other current regulator voltages VS1, VS2 and consequently identical to the target voltage value VMS. The control circuit 12 is designed to determine the further and the additional duty ratios TV2, TV3 according to the following equation on the basis of the determined further target current value SW2 and the additional target current value SW3:

$$TV2 = \frac{ISET \cdot PWM}{SW2} = \frac{ISET \cdot 100\%}{SW2}$$
$$TV3 = \frac{ISET \cdot PWM}{SW3} = \frac{ISET \cdot 100\%}{SW3}$$

Consequently the control circuit 12 adjusts at least one of the duty ratios, the further and the additional duty ratios TV2, TV3 in the present case, to be lower than the predetermined duty ratio PWM. The control circuit 12 also adjusts at least one of the target current values, the further and the additional target current values SW2, SW3 in this case, to be higher than the predetermined target current value ISET. If a characteristic of the electrical loads 14, 37, 48 changes, due to a temperature effect for example, the control circuit 12 modifies at least one of the target current values SW1, SW2, SW3.

The predetermined average current value PWM·ISET can be achieved for all three electrical loads 14, 37, 48, both the target current values SW1 SW2, SW3 and the duty ratios TV1, TV2, TV3 being adapted in such a manner that the supply voltage VDC is reduced. The power consumed in the current regulators 13, 36, 47 is advantageously reduced thereby. A temperature limit frequently exists and the current regulators are integrated on a semiconductor body or realized using external power transistors. The lower power consumption can lead to lower requirements regarding heat dissipation and a smaller overall size of the housing being sufficient.

Figure 1D:
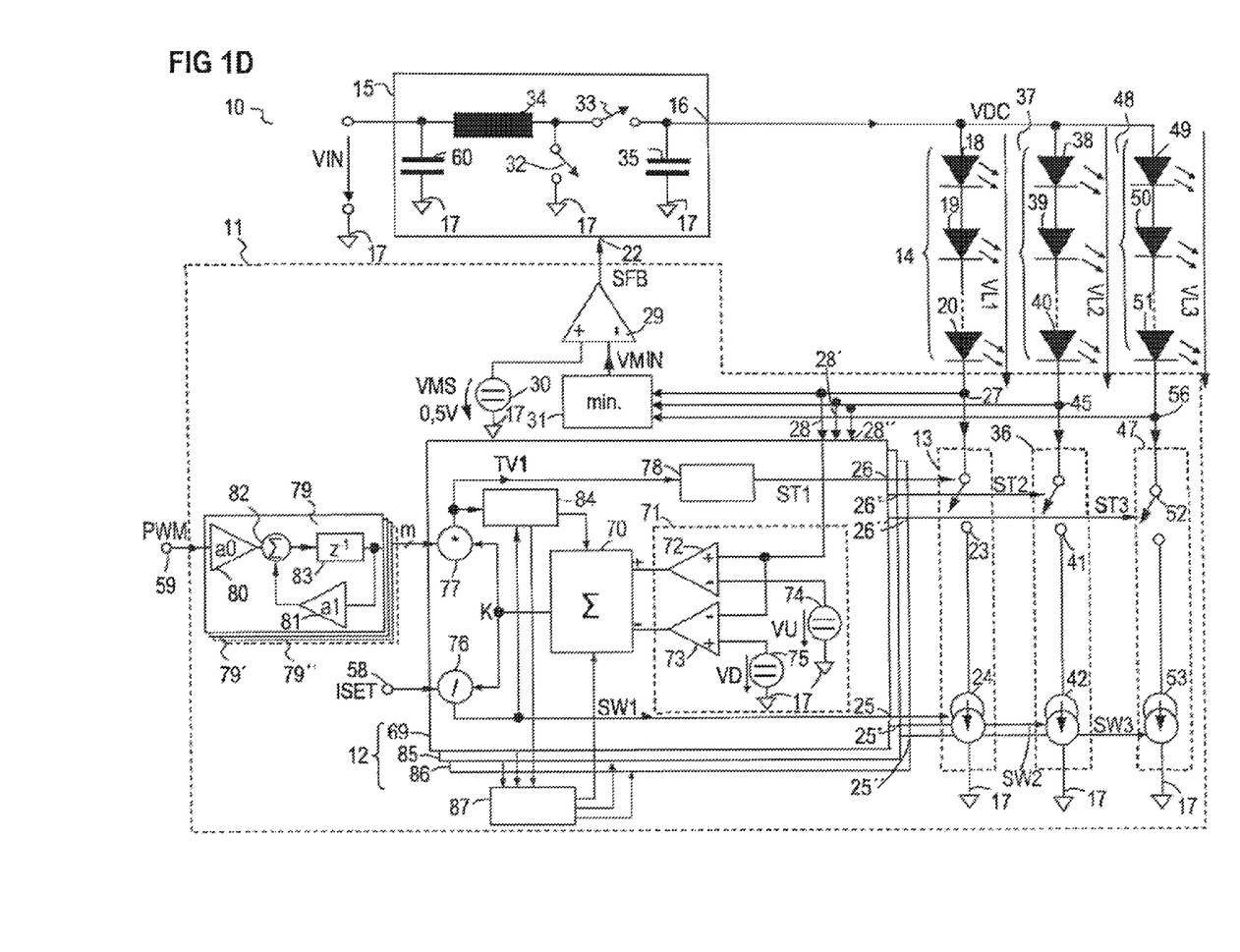

FIG. 1D shows a further exemplary embodiment of a lighting arrangement according to the proposed principle, which is a refinement of the lighting arrangements shown in FIGS. 1A-1C. The control circuit 12 has a control block 69 with an up/down counter 70, which is coupled on the input side to the load terminal 27. A window comparator 71 of the control block 69 additionally couples the load terminal 27 to the up/down counter 70. The window comparator 71 has a first and a second comparator 72, 73, the outputs of which are each connected to an input of the up/down counter 70. A first input of the first comparator 42 is connected to the voltage-tapping node 27. A second input of the first comparator 72 is connected to a first reference voltage source 74. A first input of the second comparator 73 is connected to a second reference voltage source 75. A second input of the second comparator 73 is connected to the load terminal 27.

The control block 69 comprises a first functional unit 76, which is connected at a first input to an output of the up/down counter 70. A second input of the first functional unit 76 is connected to a first setting input 58. An output of the first functional unit 76 is connected via the first control output 25 to the control input of the current source 24. The first functional unit 76 is realized as a divider.

In addition, the control block 69 has a second functional unit 77, which is connected at a first input to the output of the up/down counter 70. A second input of the second functional unit 77 is coupled to the second setting input 59. A lowpass filter 79, 79', 79" is arranged between the second setting input 59 and the second input of the second functional unit 77. The lowpass filter 79, 79', 79" is nth order and is implemented in the drawing as a series circuit of three individual stages 79, 79', 79" of the filter. The lowpass filter 79 has two buffers 80, 81, a summing unit 82 and a delay unit 83. One input of the second functional unit 77 is connected via the second control output 26 to the control input of the switch 23. A signal generator 78 of the control block 69 is arranged between the output of the second functional unit 77 and the second control output 26. The second functional unit 77 is implemented as a multiplier.

The first and the second functional units 76, 77 are realized as digital circuits. The first and second functional units 76, 77 are implemented as combinatoric logic. The control block 69 further comprises a limiting unit 84. The limiting unit 84 is arranged between the output of the second functional unit 77 and an additional input of the up/down counter 70. The limiting unit 84 is additionally connected on the input side to the output of the first functional unit 76.

The control circuit 12 also comprises a further control block 85, which is realized like the control block 69. The further control block 85 is connected on the input side to the further load terminal 45, and on the output side to the control terminals of the further current source 42 and the further switch 41. The control circuit 12 further comprises an additional control block 86, which is correspondingly connected on the input side to the additional load terminal 56 and on the output side to the control inputs of the additional switch 52 and the additional current source 53. The control circuit 12 further comprises a coordination circuit 87, which is connected on the input side to the control block 69, the further control block 85 and the additional control block 86, and on the output side to the up/down counter 70 of the three control blocks 69, 85, 86.

The first reference voltage source 74 provides an upper reference voltage VU. The second reference voltage source 75 provides a lower reference voltage VD. The range between the upper and the lower reference voltages VU, VD is a predetermined signal range. The window comparator 71 compares the current regulator voltage VS1 to the upper reference voltage VU and the lower reference voltage VD. Thus the result of the comparison of the current regulator voltage VS1 to the upper reference voltage VU can be tapped at the output of the first comparator 72. Correspondingly, the result of the comparison of the current regulator voltage VS1 to the lower reference voltage VD is provided at the output of the second comparator 73. An adjusting coefficient K can be tapped at the output of the up/down counter 70. If the current regulator voltage VS1 is higher than the upper reference voltage VU, then the up/down counter 70 counts upward and the adjusting coefficient K is increased. On the other hand if the current source voltage VS1 is lower than the lower reference voltage VD, then the up/down counter 70 counts downward and the adjusting coefficient K is reduced. If the current source voltage VS1 is lower than the upper reference voltage VU and higher than the lower reference voltage VD, however, the up/down counter 70 does not modify the adjusting coefficient K and the latter is constant. The up/down counter 70 is designed, for example, to count in increments of 0.1 in the range from 0.5 to 2.0 and to output the adjusting coefficient K from the range of 0.5 to 2.0 with a step width of 0.1.

The target current value SW1 follows from the division of the predetermined target current value ISET by the adjusting coefficient K. The signal generator 48 provides the clock signal ST1 with the duty ratio TV1, for which the adjusting coefficient K is multiplied by the predetermined value PWM of the duty ratio. A clock cycle of the clock signal ST1 has a switched-on phase in which the clock signal ST1 has the value 1 and a switched-off phase in which the clock signal ST1 has the value 0. The duty ratio TV1 is the duration of the switched-on phase divided by the period of a clock cycle. The target current value SW1 and the duty ratio TV1 are thus ascertained according to the following equations:

$$SW1 = ISET/K \text{ and } TV1 = PWM \cdot K$$

Because the first and second functional units 76, 77 perform mathematical operations that are inverse to one another, the resulting average current value AVC is constant. In case the current regulator voltage VS1 is too high, the up/down counter 70 counts up and thus increases the duty ratio TV1 and lowers the target current value SW1. The limiting block 84 limits the up/down counter 70 in such a manner that the duty ratio TV1 does not exceed the value of 100%. The block 84 can further be designed to adjust minimum or maximum values for the target current value SW1. This has the effect that the target current value SW1 does not fall below a minimum target current value and does not exceed a maximum target current value. The predetermined target current value SW1 and the predetermined duty ratio PWM are realized as digital values.

The coordination circuit 87 is designed to coordinate the control blocks 69, 85, 86. The coordination circuit 87 thus implements the methods described in FIGS. 1A-1C; for example the coordination circuit 87 has the effect of deciding which of the current regulators 13, 36, 47 is adjusted to the 100% duty ratio and how the other current regulators follow the thus-adjusted current regulator.

The up/down counter 70 controls the time sequence. The time sequence of the up/down counter 70 is synchronized with the time sequence of the signal generator 78. The signal generator 78 is realized as a pulse width modulated generator. The up/down counter 70 is constructed as a state machine. The up/down counter 70 only makes decisions and determines a new value of the adjusting coefficient K if a current regulator current IS1, IS2, IS3 flows through the respective electrical load 14, 37, 48. For example, the up/down counter 70 outputs the adjusting coefficient K from a set of values such as 0.5/0.6/0.7/ . . . /2.0.

In an initialization phase, the adjusting coefficient K is set to the value 1. Thus the up/down counter 70 outputs the adjusting coefficient K with the value 1. In the initialization phase, the voltage converter 15 starts and performs regulation of the voltage converter 15. The regulation loop of the voltage converter 15 is realized by means of the selection block 31 and the comparison circuit 29.

In an operating phase, the following steps are repeated:
There is a wait until the clock signal ST1 indicates the value 1 according to the switched-on phase.
In a comparison phase, the current regulator voltage VS1 is compared to the upper and lower reference voltages VU, VD, before the clock signal ST1 returns to the value 0 of the switched-off phase. The further current regulator voltage VS2 and the additional current regulator voltage VS3 are likewise compared to the upper and lower reference voltages VU, VD. A point in time shortly before the end of the switched-on phase is very suitable, because then the signals have stabilized.

There is a wait until the clock signals ST1, ST2, ST3 indicate the value 0 of the switched-off phase or, in the case of duty ratios TV1, TV2, TV3, the end of the clock cycle is reached with the value 100%.

If the first comparator 72 was triggered during the comparison phase, i.e. if the current regulator voltage VS1 is higher than the upper reference voltage VU during the comparison phase, the adjusting coefficient K is increased. In an alternative embodiment, the adjusting coefficient K is only increased if the first comparator 72 was triggered during a first number M of successive clock cycles. The first number M is greater than 1 and can be 20, for example.

If the second comparator 73 was triggered during the comparison phase, i.e. if the current regulator voltage VS1 is lower than the lower reference voltage VD during the comparison phase, the adjusting coefficient K is reduced. In an alternative embodiment, the adjusting coefficient K is only increased if the first comparator 73 is triggered during the first number M of successive clock cycles.

An output signal provided by the coordination circuit 87 is checked in every nth clock cycle. If the output signal is at logic value 1, the adjusting coefficient K is increased.

As long as the limiting unit 84 determines that the duty ratio TV1 exceeds a predetermined maximum value for the duty ratio, the adjusting coefficient K is reduced.

As long as the limiting unit 84 determines that the duty ratio TV1 is below a predetermined minimum value for the duty signal, the adjusting coefficient K is increased.

The above-specified steps are repeated. The steps are carried out not only by the control block 69 but in a corresponding manner by the further control block 85 and the additional control block 86.

The coordination circuit 87 monitors all channels, i.e. the control block 69, the further control block 85, and the additional control block 86 in parallel and is designed such that it maximizes the duty ratio TV1, TV2, TV3 of all three control blocks 69, 85, 86. The goal is to achieve a duty ratio TV1, TV2, TV3 of 100% for at least one control block 69, 85, 86. The coordination circuit 87 is designed to operate the control blocks 69, 85, 86 in such a manner that the up/down counter 70 in the various control blocks 69, 85, 86 sets the respective adjusting coefficient K to the value 1 if none of the duty ratios TV1, TV2, TV3 of the three control blocks 69, 85, 86 exceeds the predetermined maximum value of the duty ratio. The predetermined maximum value of the duty ratio is 100%.

Thus the window comparator 71 must determine that the upper reference voltage VU has been exceeded in the first number M of successive clock cycles or the lower reference voltage VD has not been reached during the first number M of successive clock cycles, before the up/down counter 70 changes the adjusting coefficient K. The new value of the adjusting coefficient K is used for adjusting the clock signal ST1 and the target current value SW1 in the next subsequent clock cycle.

After adjusting the new target current value SW1 and the new clock signal ST1, the current regulator voltage VS1 is further monitored. If it is again found by the window comparator 71 during a first number M of successive clock cycles that the current regulator voltage VS1 in all these clock cycles is higher than the upper reference voltage VU or alternatively lower than the lower reference voltage VD, a new target current value SW1 and a new value TV1 for the duty ratio is provided by means of the clock signal ST1 at a second point in time, namely a point in time after these successive M clock cycles. Thus new target current values SW1 and duty ratios TV1 are calculated during the operation of the driver circuit 11 at a plurality of points in time and are used for adjusting the current regulator 13.

In an alternative embodiment, not shown, the first functional unit 76 is realized as a multiplier and the second functional unit 77 as a divider. The up/down counter 70 in this case is coupled with the window comparator 71 in such a manner that the adjusting coefficient K is increased if the current regulator voltage VS1 is lower than the lower reference voltage VD, and the adjusting coefficient K is reduced if the current regulator voltage VS1 is higher than the upper reference voltage VU.

In an alternative embodiment, the lowpass filter 79 is designed to convert the predetermined duty ratio PWM, which is present as a digital signal, into an analog signal. The analog signal that arises in this manner is then multiplied by the current regulator current IS1. The light-emitting diodes 18, 19, 20 are driven linearly, which reduces the load voltage and increases the effectiveness. The first and second functional units 76, 77 are realized as analog multiplier or divider circuits.

Figure 2:
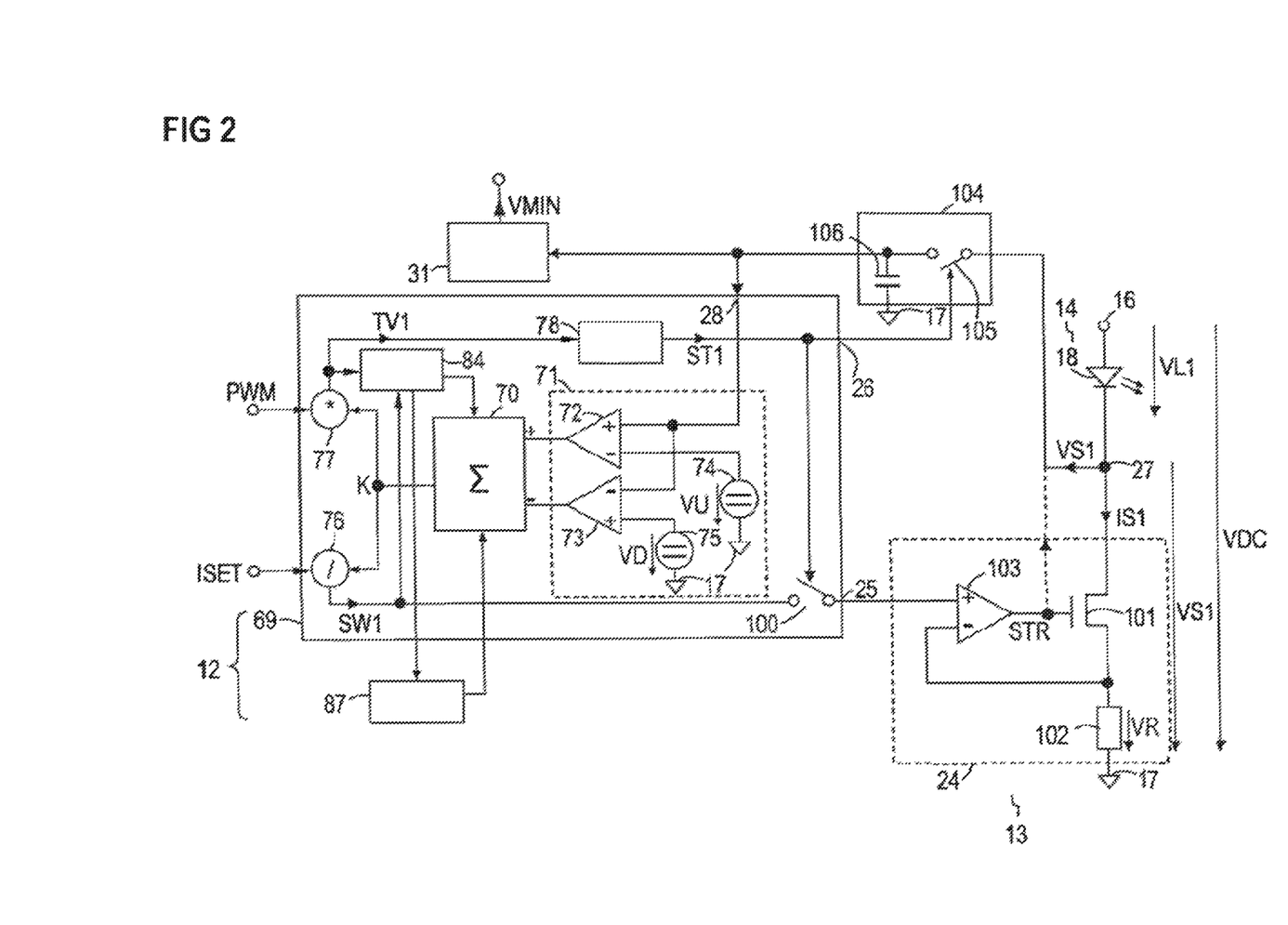
FIG. 2 shows an exemplary embodiment of a control circuit and a current regulator according to the proposed principle.

FIG. 2 shows an exemplary embodiment of a control circuit 12 and a current regulator 13 according to the proposed principle, of the type that can be used in the lighting arrangements according to FIGS. 1A-1D. The circuit block 69 has an output switch 100, which is arranged between the first functional unit 76 and the first control output 25. One output of the second functional unit 77 is connected via the signal generator 78 to a control terminal of the output switch 100. The second control output 26 of the control circuit 12 is thus eliminated. The driver circuit 11 comprises a sample-and-hold circuit 104, which couples the load terminal 27 to the selection block 31 and the control input 28. The sample-and-hold circuit 104 comprises a sample switch 105 and a holding capacitor 106. A control terminal of the sample-and-hold circuit 104 is coupled to the output of the signal generator 78.

The current regulator 13 comprises a transistor 101 and a current sensor 102 that are in series with one another. The load terminal 27 is thus connected to the reference potential terminal 17 via a series circuit comprising the controlled path of the transistor 101 and the current sensor 102. The transistor 23 can thus be eliminated and is replaced by a connection line. The current sensor 102 is realized as a resistor. The current regulator 13 has an amplifier 103 that is coupled on the output side to a control terminal of the transistor 101. A first input of the amplifier 103 is connected to the first control output 25. One output of the current sensor 102 is connected to a second input of the amplifier 103. In addition, a node between the transistor 101 and the current sensor 102 is connected to the second input of the amplifier 103. The current regulator 24 is realized as a controlled current regulator. The current regulator 24 has an internal control loop. The control loop comprises the transistor 101, the current sensor 102 and the amplifier 103.

The clock signal ST1 controls the output switch 100. The target current value SW1 provided by the first functional unit 76 is supplied via the output switch 100 to the current regulator 13 and thus to the first input of the amplifier 103. Therefore the target current value SW1 is present at the first input of the amplifier 103 in the switched-on phases of the clock cycle of the clock signal ST1. In the switched-off phases of the respective clock cycle, the value 0 V is present at the first input of the amplifier 103. The amplifier 103 provides a control signal STR, with which the transistor 101 is controlled. The transistor 101 controls the current regulator current IS1 on the basis of the clock signal ST1 and the target current value SW1. The current regulator current IS1 flowing through the current sensor 102 is measured by the sensor 102. A current signal in the form of a voltage VR that is supplied to the second input of the amplifier 103 drops at the resistor of the signal sensor 102. The control signal STR is formed on the basis of a comparison between the target current value SW1 and the sensor signal VR. Due to the feedback loop formed by the transistor 101, the current sensor 102 and the amplifier 103, the current sensor current IS1 is proportional to the target current value SW1 according to the equation IS1=SW1·R. R is the resistance value of the resistor in the current sensor 102.

The sample-and-hold circuit 104 is likewise controlled by the clock signal ST1. In the switched-on phases of the clock signal ST1, the current regulator voltage VS1 is sampled and is also present at the output of the sample-and-hold circuit 104 during the switched-off phases of the clock signal ST1.

The further and the additional current regulators 36, 47 can likewise be realized like the current regulator 13. Accordingly, the further circuit block 85 and the additional circuit block 86 can each have an output switch that corresponds to the output switch 100 in the circuit block 69. A further and an additional sample-and-hold circuit of the driver circuit 12 analogous to the sample-and-hold circuit 104 are also provided.

The current regulator 13 has at most one power transistor, namely the transistor 101. The controlled current path of the at most one transistor, namely the transistor 101, is arranged between the electrical load 14 and the reference potential terminal 17. The switch 23 can advantageously be eliminated, so that resistance losses are reduced.

In an alternative embodiment, the selection block 31 and the control input 28 of the control circuit 12 are coupled to a node between the amplifier 103 and the control terminal of the transistor 101. The connection is shown in dashes. The MAX value of the inputs, i.e. the maximum voltage value of the control signals STR of the current regulators 13, 36, 47, is formed in the selection block 31. The inputs for the comparators 72, 73 are interchanged. On the contrary, the connection of the selection block 31 and the control input 28 to the load terminal 27 is eliminated. Thus the control signal STR is supplied to the selection block 31 and the control circuit 12. The selection block 31 is realized such that it outputs the largest of the signals present on the input side at its output. A high value of the control signal STR indicates that the supply voltage VDC is too low. The comparison circuit 29 and the voltage converter 15 are realized such that the supply voltage VDC is increased if the control signal STR is greater than the target voltage value VMS. The control signal STR is fed to the window comparator 71. If the control signal STR is above the predetermined signal range, the target current value SW1 is reduced. If the control signal STR is below the predetermined signal range, the target current value SW1 is increased.

The invention claimed is:

1. A driver circuit for a current regulator that can be coupled in series to an electrical load, the driver circuit comprising:
   a control circuit for controlling the current regulator and being configured to determine at least two target current values of the current regulator current for the current regulator for at least two points in time in an operating phase on the basis of a signal that can be tapped at the current regulator,
   wherein the control circuit is configured to determine an adjusting coefficient on the basis of the signal that can be tapped at the current regulator and to determine the target current values respectively by multiplying or dividing the adjusting coefficient and a predetermined target current value,
   wherein the control circuit is configured to operate the current regulator with pulse width modulation,
   wherein the operating phase comprises at least two clock cycles, and
   wherein the at least two points in time are situated in different clock cycles of the operating phase.

2. The driver circuit according to claim 1, wherein the control circuit is configured to determine the at least two target current values of the current regulator current at the least two points in time in the operating phase on the basis of the signal that can be tapped at the current regulator, in such a manner that a supply voltage associated with the current regulator is reduced.

3. The driver circuit according to claim 1 or 2, wherein the supply voltage drops across a series circuit comprising the electrical load and the current regulator.

4. The driver circuit according to claim 1, wherein the control circuit is configured to determine a duty ratio, at which the current regulator is operated, on the basis of the signal that can be tapped at the current regulator.

5. The driver circuit according to claim 1, wherein the signal that can be tapped at the current regulator is a signal from a group comprising:
   a current regulator voltage that can be tapped at a load terminal between the current regulator and the electrical load, and
   a control signal of a transistor that adjusts the current regulator current and is comprised by the current regulator.

6. The driver circuit according to claim 1, wherein the control circuit is configured to determine a duty ratio of the current regulator by dividing or multiplying the adjusting coefficient and a predetermined duty ratio.

7. The driver circuit according to claim 1, the control circuit comprising:
   a window comparator to which the signal that can be tapped at the current regulator can be supplied; and
   an up/down counter, which is coupled on the input side to the window comparator and at which the adjusting coefficient can be tapped on the output side.

8. The driver circuit according to claim 7, circuit comprising a first functional unit realized as a multiplier or divider that is coupled at a first input to the up/down counter, to which first functional unit a signal representing a predetermined target current value can be supplied at a second input, and at which first functional unit a signal representing the target current value for the current regulator can be tapped on the output side.

9. The driver circuit according to claim 8, the control circuit comprising a second functional unit, which is configured for performing an inverse operation compared to an operation of the first functional unit, which is coupled at a first input to the up/down counter, to which second functional unit a signal representing a predetermined duty ratio can be supplied at a second input, and at which second functional unit a signal representing a duty ratio for the current regulator can be tapped on the output side.

10. The driver circuit according to claim 9, comprising a lowpass filter that is coupled on the output side to the second input of the second functional unit.

11. The driver circuit according to claim 1, wherein in which the control circuit is configured to control at least one further current regulator that can be arranged in series with at least one further electrical load and is configured to determine at least two target current values of the current regulator current for the at least one further current regulator for at least two points in time in the operating phase on the basis of a signal that can be tapped at the at least one further current regulator.

12. The driver circuit according to claim 11, wherein the control circuit is configured to adjust the duty ratios and the target current values for the current regulator and the at least one further current regulator in such a manner that at least one of the target current values differs from a predetermined target current value.

13. The driver circuit according to claim 11, wherein the control circuit is configured to adjust the duty ratios and the target current values for the current regulator and the at least one further current regulator in such a manner that at least one of the duty ratios differs from a predetermined target duty ratio.

14. A lighting arrangement, comprising:
the driver circuit according to claim 1;
the electrical load; and
a voltage converter with a voltage converter output,
wherein the driver circuit comprises the control circuit and the current regulator, which is connected on the input side to the control circuit, and a series circuit comprises the current regulator and the electrical load and is arranged between the voltage converter output, at which a supply voltage can be tapped, and a reference potential terminal.

15. A method for driving an electrical load, comprising:
tapping a signal at a current regulator that is arranged in series with the electrical load;
determining at least two target current values of the current regulator current of the current regulator for at least two points in time in an operating phase on the basis of the signal that can be tapped at the current regulator in such a manner that a supply voltage dropping across the electrical load and the current regulator is reduced, wherein a respective adjusting coefficient is determined on the basis of the signal that can be tapped at the current regulator, and the respective target current value is ascertained by multiplication or division of a predetermined target current value and the adjusting coefficient; and
adjusting the target current values at the current regulator,
wherein the control circuit is configured to operate the current regulator with pulse width modulation,
wherein the operating phase comprises at least two clock cycles, and
wherein the at least two points in time are situated in different clock cycles of the operating phase.

16. A driver circuit for a current regulator that can be coupled in series to an electrical load, the driver circuit comprising:
a control circuit for controlling the current regulator and being configured to determine at least two target current values of the current regulator current for the current regulator for at least two points in time in an operating phase on the basis of a signal that can be tapped at the current regulator,
wherein the control circuit is configured to determine an adjusting coefficient on the basis of the signal that can be tapped at the current regulator and to determine the target current values respectively by multiplying or dividing the adjusting coefficient and a predetermined target current value, and
wherein the control circuit is configured to operate the current regulator with pulse width modulation and to ascertain a duty ratio, at which the current regulator is operated, on the basis of the signal that can be tapped at the current regulator.

* * * * *